United States Patent Office 3,540,861
Patented Nov. 17, 1970

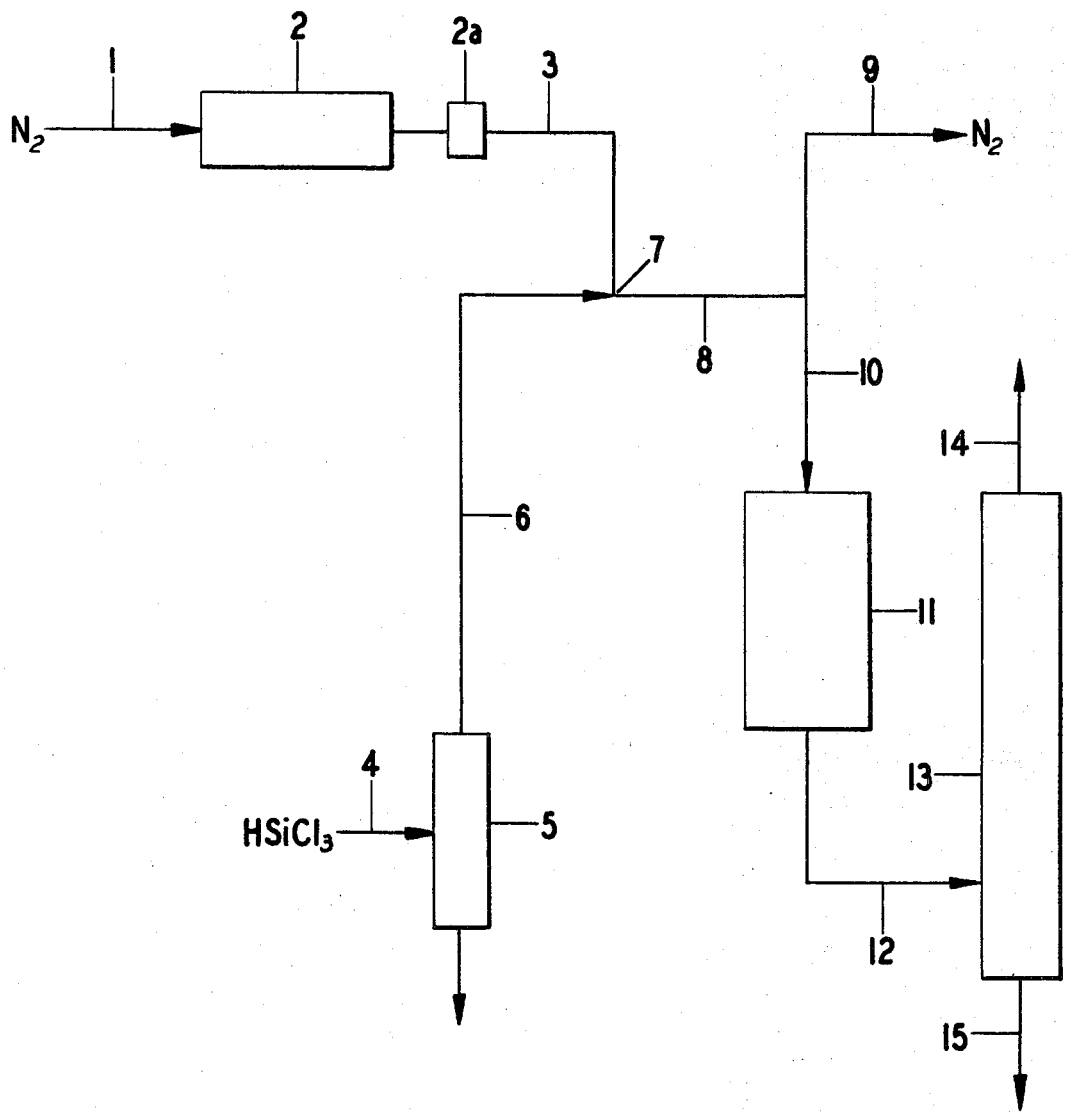

3,540,861
PURIFICATION OF SILICON COMPOUNDS
Howard B. Bradley, Pound Ridge, and Donald J. Neal, North Tonawanda, N.Y., assignors to Union Carbide Corporation, New York, N.Y., a corporation of New York
Filed Feb. 7, 1968, Ser. No. 703,717
Int. Cl. C01b *33/08;* G01m *31/06*
U.S. Cl. 23—366
11 Claims

ABSTRACT OF THE DISCLOSURE

The process of removing boron impurities from chlorosilanes which comprises dispersing preformed partial hydrolyzates of a chlorosilane in a clear liquid body of a chlorosilane containing an undesired quantity of boron impurity and thereafter separating chlorosilane from the partial hydrolyzates and from boron contained therein to obtain such chlorosilane free of such undesired quantity of boron impurity.

---

This application is a continuation-in-part of copending application Ser. No. 357,278, filed Apr. 3, 1964.

This invention relates to a process for removing impurities from silicon compounds. More particularly, this invention is directed to the removal of impurities from silane chlorides which possess at least one chlorine atom per silicon atom.

Silicon metal useful in semi-conductors, such as transistors, must be extremely pure so that (1) it acts as a semi-conductor; (2) its purity permits wide control over properties obtained through addition of "doping agents," such as boron or phosphorus compounds in desired calculated amounts; and (3) the desired resistivity can be obtained. In general, it is desired that "semi-conductor grade" silicon metal contain less than 100 parts per billion (p.p.b.) by weight total impurities. Preferably, the silicon metal should contain less than 25 p.p.b. by weight total impurities. It is also desired that the kind of impurities be controlled. Some impurities, such as tin, can be tolerated in larger amounts than can phosphorus, arsenic and boron, for example. Tin is tetravalent and is to a limited extent compatible with the tetravalent silicon crystal lattice. Phosphorus and arsenic, on the other hand, are pentavalent and contribute excess electrons to the silicon crystal and can be tolerated to a certain extent only when a n-type semi-conductor is desired. Boron which is trivalent causes a deficiency of electrons in the silicon crystal and can be tolerated only when a p-type semi-conductor is desired.

Metallic silicon for semi-conductor use is generally prepared by reduction of silicon-containing compounds, such as silicon tetrachloride, trichlorosilane (HSiCl₃) and dichlorosilane (H₂SiCl₂), with hydrogen, zinc, sodium or metal hydrides, for example. Metallic silicon can also be obtained by thermal decomposition of compounds such as monosilane (SiH₄), monochlorosilane and trichlorosilane.

In order to obtain high purity silicon metal it is desirable to employ high purity starting materials. Many impurities, such as iron, copper and manganese can be substantially completely removed from the silicon-containing starting materials, for example, chlorosilanes by distillation. Other impurities, such as arsenic, phosphorus, boron and even sulfur cannot be reduced to desired levels by distillation even in a column containing about 10–100 theoretical distillation plates.

Complex zone refining techniques on the metallic silicon are necessary to reduce the levels of such impurities to desired amounts. A single zone refining pass through the silicon metal product is generally employed to remove last traces of iron, copper and manganese for example, but multiple passes are required to lower the arsenic and phosphorus content. Boron, however, is not efficiently removed by the usual zone refining technique, it being necessary to modify the process and prolong the treatment. Known physical and chemical methods fully capable of removing substantially all of the boron impurities from silicon metal are expensive and complex.

It is highly desirable for silicon metal for use in semi-conductors to have less than about 0.8 p.p.b. boron. To insure that the silicon metal prepared from the silicon-containing compound used as a starting material contains no more than about 0.8 p.p.b. boron, preferably no more than about 0.25 p.p.b. boron is present in the starting material.

Trichlorosilane, for example, is widely used as a raw material for the production of "semi-conductor grade" silicon. It is not known in what form the boron is present in trichlorosilane, but since it is substantially impossible to remove all the boron from trichlorosilane by distillation, it is believed that the boron impurities are present, at least in part, in the form of relatively low boiling point compounds, such as ≡B—Cl or ≡B—H compounds.

The process of this invention involves the treatment of chlorosilanes of the formula:

(I)   $\mathrm{SiH_aCl_b}$ wherein *a* is the integers 0, 1, 2 or 3, *b* is the integers 1, 2, 3 or 4, and the sum of *a* and *b* is 4. Compounds falling within Formula I are monochlorosilane, dichlorosilane, trichlorosilane and tetrachlorosilane.

The process of this invention involves treating the aforementioned chlorosilanes to remove substantial boron impurities therein to produce electronic grade chlorosilanes. By the term "electronic grade chlorosilanes," it is meant chlorosilanes which on standard reduction form elemental silicon which meets the standards of the electronics industry in semi-conductor use. Thus the chlorosilanes treated according to the process of this invention are of non electronic grade, i.e., contain undesired quantities of boron therein.

The process of this invention involves dispersing, preferably uniformly, in a clear liquid body of a chlorosilane, as above described, preformed colloidal particles which are the partial hydrolyzates of a chlorosilane and thereafter separating the chlorosilane from the partial hydrolyzates leaving boron which was present in the chlorosilane in combination with the partial hydrolyzates.

The preferred process of this invention involves providing an essentially non-turbulent, clear liquid body of a chlorosilane, as above described, with an atmosphere above it. The atmosphere contains (1) chlorosilane vapor in an amount equal to its partial pressure at the temperature of the body and the atmosphere and (2) water vapor. The number of moles of water in said atmosphere is not greater than the number of moles of chlorosilane in the atmosphere. Chlorosilane in the atmosphere is partially hydrolyzed by the water vapor and the partial hydrolyzates are precipitated from the atmosphere onto the surface of the body wehreby the body is made cloudy or turbid in appearance. Then the chlorosilane is separated from the partial hydrolyzates leaving boron which was present in the chlorosilane in combination with the partial hydrolyzates.

There are statements in the art that silane and some chlorosilanes can be mixed in liquid or vapor state with water to effect hydrolysis of boron impurities which can thereafter be separated from the silane or chlorosilane. However, direct reaction in a large body of the silane between water and boron compounds requires the use of large quantities of water, e.g., at least as much as 0.1% by volume of water based on the volume of silane or chlorosilane. Some procedures in the art require amounts at least as great as one mole of water per 100 moles of the chlorosilane. The reason for these large amounts of water is simple. Since the amount of boron in the silane is small compared to the amount of silane, large amounts of water are needed to overcome the mass action effect of the silane to water, even though the boron compounds react at a faster rate than the silanes. Unless a large quantity of water is used, much of the boron present will not be removed. However, the more water that is added, the more silane or chlorosilane that is hydrolyzed and rendered useless and the removal, and presence, of by-products become a processing annoyance.

The process of this invention possesses the following unique features:

(1) Water is reacted with a small fraction of the chlorosilane undergoing purification and the hydrolyzate can be metered for introduction to the body of chlorosilane.

(2) The process can be conducted continuously and at high rates.

(3) The boron impurity is sequestered only by a partial hydrolyzate of the chlorosilane, and in the case of the preferred process, the water vapor employed contacts at most the surface of the liquid body of chlorosilane.

(4) No pyrolysis of the silane is required.

(5) Extremely small amounts of water are needed, e.g., amounts of water usually not in excess of 0.05% volume of water vapor based on the total volume of chlorosilane liquid and vapor.

(6) A small fraction of chlorosilane is rendered unuseable for forming elemental silicon because the process avoids the presence of localized concentrations of water and chlorosilane. For example, it has been found that not more than .05 mole percent of the chlorosilane is converted to unuseable product.

(7) The process can be completed in minutes or less, typically within 10 minutes as compared to the prior art processes which, it is stated, require hours in order to render the boron separable.

(8) A minimum amount of corrosive HCl is formed, therefore the treated chlorosilane can be handled during processing with equipment made of conventional, low cost steel.

The process of this invention, based on some analytical evidence, is believed to occur in the following manner. The chlorosilane is reacted with water to produce essentially partial hydrolyzates of chlorosilane, i.e., containing one, and usually not more than 2, silicon bonded OH. The reactions are illustrated in the following equation:

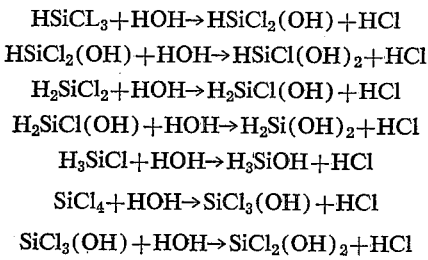

These partial hydrolyzates are introduced to the body, for example, by depositing them from the atmosphere, either as distinct molecules or as complex hydrates. Because they are particulate in nature they make the body cloudy and thus one can visually watch them become uniformly dispersed throughout the body. In a matter of seconds, the whole body can be rendered turbid by these apparent particles and no apparent localized concentrations of these particles will be noted. These apparent particles are believed to sequester the boron in the body to form complex chemical structures which have boiling points considerably higher than the chlorosilanes. As a result, the chlorosilanes can be easily separated from the boron which is part of such complex structures.

The separation of chlorosilane can be easily effected by distillation, dialysis, decantation and the like. The most practical procedure is distillation of the chlorosilane leaving behind a residue containing boron impurity. The chlorosilane distillate is of extremely good purity and can be used in making elemental silicon which meets the strictest purity standards of the electronics industry.

There are many ways by which one may form the partial hydrolyzates and introduce them into the liquid body of chlorosilane. The preferred method described above represents one of the simplest and most direct ways to make preformed hydrolyzates and deposit them into the liquid body. Other methods are apparent.

For example, a high velocity stream of pure steam (such as steam made from distilled water) is jetted into the top of a large vessel containing a liquid body of chlorosilane and an overhead atmosphere saturated with chlorosilane. The partial hydrolyzate formed in the atmosphere zone is allowed to rain down on the liquid body to become deposited therein and cloudy liquid can be tapped from the vessel for subsequent separation of purified chlorosilane, for example, by distillation, i.e., evaporation of the chlorosilane thereby leaving a residue of boron impurities.

Another technique involves passing an inert gas stream laden with water vapor into a stream of chlorosilane vapor at such a high velocity that turbulence occurs when the two streams contact. Then the stream of partial hydrolyzate is passed into a large vessel containing a non-turbulent, liquid body of chlorosilane where the colloidal partial hydrolyzate is rained down onto the liquid body and deposited therein. In this embodiment, the inert gas stream can be vented from same vessel while the colloidal hydrolyzate is precipitating and depositing in the liquid body. The usual methods for separating the chlorosilane from the boron impurities may be employed.

An alternative to the above technique involves rapid agitation of liquid body during precipitation. In both of these techniques, the atmosphere above the liquid body is essentially free of water and a distinctly preformed colloidal hydrolyzate is deposited into the body.

In all such techniques including the preferred method, the number of moles of water vapor reacted with chlorosilane vapor is preferably not greater than the mole concentration of chlorosilane in the zone of the reaction. In the preferred operations of the process of this invention, the colloidal partial hydrolyzate exists as a dispersion in chlorosilane vapor while precipitation of the hydrolyzate occurs.

The number of moles of water employed is desirably at least equal to the number of moles of boron in the chlorosilane, preferably the number of moles of water exceed the number of moles of boron in the chlorosilane. The mole concentration of boron in the chlorosilane can be determined first on a laboratory analytical scale by the process of this invention by employing smaller measured quantities of the chlorosilane, precipitating partial hydrolyzate therein, distilling chlorosilane from the boron-containing residue, and analyzing the residue for boron by known techniques. By repeating the analysis with a variety of partial hydrolyzate concentrations, one can gain a fix on the boron concentration.

Usually water is carried as vapor suspended in inert gas to the zone where reaction with chlorosilane vapor occurs. Though pure water vapor free of other gases can be employed, best results occur with inert gases laden with water vapor. A useable inert gas is any gas or vapor which can be mixed with water vapor and the chlorosilane under the conditions of the process without reaction with the water vapor and chlorosilane. Particularly desirable inert gases include nitrogen, argon, carbon dioxide, methane, and the like. If the temperature of the reaction is low enough, air can be employed. In fact, under such conditions fluorocarbon gases, e.g., chlorodifluoromethane, and other volatile halogenated hydrocarbons may be used as the inert gas.

The purified chlorosilane, such as trichlorosilane, obtained by the present process typically contains less than 0.25 p.p.b. by weight boron, preferably less than .15 p.p.b by weight of boron. As such, this purified material has improved utility in the production of high quality silicon metal.

A special embodiment involves the employment of the process of this invention for analyzing the amount of boron in silanes, such as those having the formula $SiH_aX_b$, where X is a halogen of the group consisting of fluorine, chlorine, bromine and iodine, $a$ and $b$ are one of the integers 0, 1, 2, 3 or 4 and the sum of $a$ and $b$ is 4. Sensitive colorimetric methods are known in the art for detecting boron in the range of $10^{-8}$ grams in 10 ml. of liquid. In order to increase the sensitivity of these techniques to the range of a few parts per billion by weight, prior art methods employed larger samples of silane so that the boron content of an aliquot portion of the sample was increased. One prior method that had been suggested for increasing such boron content was to evaporate a large portion of the aliquot sample. The residual concentrated portion was intended to contain a larger amount of boron than would a similar volume of unevaporated sample. This method is not successful for concentrating trace amounts of boron compounds because they are also volatilized somewhat during the evaporation concentration of the sample. Use of the partial hydrolyzate treatment of liquid silanes, on the other hand, concentrates essentially all of the boron into high boiling point, apparently hydrolyzed boron compounds. Evaporation of a large sample to a relatively small volume concentrated aliquot portion thus retains all the boron. In this manner the colorimetric analytical methods can now be employed to detect trace amounts of boron in silicon-containing compounds such as amounts less than 0.01 p.p.b. by weight depending on the size of the original sample employed.

To illustrate the effectiveness of the present invention in removing boron impurities and the analysis thereof which might be present in a semi-conductor grade silane, boron was added in known quantities and in various forms (e.g., as boron trichloride, or as boric acid in sulfuric acid or water) to several samples of $HSiCl_3$, and the resulting mixtures were then purified according to the following process. A stream of nitrogen gas which was water-saturated at 25° C. was blown onto the surface of a liquid body of the contaminated $HSiCl_3$ and a distinct turbidity was evident therein. At the same time, in order to insure that none of the boron impurities were lost through volatilization, a Dry Ice condenser was attached to the quartz glass flask containing the liquid body being treated. After the turbidity appeared in the body being treated, the sample was refluxed using a mantle heater for about 15 minutes with the Dry Ice condenser in place. The body was then cooled to room temperature; the condenser was removed; and the body was evaporated until 3 ml. of liquid remained. After the heat was removed, any remaining $HSiCl_3$ vapors were gently blown from the flask with dry nitrogen gas. The residue was then extracted with 10 ml. of concentrated $H_2SO_4$, heated to strong $SO_3$ fumes for about 1 minute and then cooled. One hundred milliliters of water were added, and the resulting mixture was then heated to a boil for a few minutes and filtered hot into a clean quartz flask. This filtrate was evaporated to dryness (until $SO_3$ fumes are given off), and then cooled. If any organic matter was evident, 20 mg. of ammonium persulfate was added, and the resulting mixture was brought to a boil for about 30 seconds. After cooling to less than 100° C., 2.00 ml. of dianthrimide reagent (20 mg. of dianthrimide in 100 ml. of $H_2SO_4$) were added to form a reaction product or a complex with the boron compounds present, and the samples were then capped with polytetrafluoroethylene film and placed in a 90° C. oven for from 10 to 15 hours. Any residue in a sample was first removed by filtering the sample through frit using a bell jar and suction, and then the optical density of the boron-dianthrimide complex present in each of the samples was read on a spectrophotometer at 620 m$\mu$ wavelength. The amount of boron "fixed" by the water and removed from the original $HSiCl_3$ mixture was then calculated, using the appropriate boron and dianthrimide calibration factors. The results obtained from the various samples tested are illustrated in the following table.

TABLE I

| Run No. | Starting mixture | Micrograms of boron found | Percent boron recovered |
|---|---|---|---|
| 1 | 10 ml. of $HSiCl_3$ with 1.5 ml. of 95% $H_2SO_4$ containing 1.5 micrograms of boron (the boron was present as boric acid in the sulfuric acid). | 1.5 | 100 |
| 2 | 100 ml. $HSiCl_3$, 0.5 ml. $H_2SO_4$ and 1 ml. of $H_2O$ containing 1 microgram of boron (as boric acid). | 1.0 | 100 |
| 3 | 100 ml. $HSiCl_3$ with 2 ml. of water containing 2 micrograms of boron (as boric acid).[1] | 2.07 | 103 |
| 4 | 200 ml. $HSiCl_3$ with 2 ml. of water containing 2 micrograms of boron (as boric acid).[1] | 2.3 | 115 |
| 5 | 200 ml. of $HSiCl_3$ with 2 ml. of water containing 2 micrograms of boron (as boric acid).[2] | 1.8 | 90 |
| 6 | 20 ml. of $HSiCl_3$ containing 2.95 micrograms of boron (as boron trichloride).[3] | 2.98 | 101 |
| 7 | 740 ml. of $HSiCl_3$ containing 2.95 micrograms of boron (as boron trichloride).[3] | 2.75 | 87 |

[1] Mixture was evaporated to dryness.
[2] Mixture was evaporated to 1 ml.
[3] Wet argon was used in place of wet nitrogen.

To illustrate the preferred embodiment of this invention, reference is made to the drawing which is a schematic representation of the preferred process described previously.

Trichlorosilane ($HSiCl_3$) is fed at line 4 to distillation column 5 to provide a flow of distilled trichlorosilane in line 6 of 1,000 pounds per hour. Simultaneously, nitrogen gas is fed through line 1 at 25° C. at 90 pounds per square inch gauge to water contactor 2 where the nitrogen gas is saturated with water. Then the water saturated gas is fed to a heater 2a where it is heated to 110° C. with steam at 50 pounds per square inch gauge.

The clear distilled trichlorosilane liquid, at a rate of 1,000 pounds per hour, is passed through purifier line 8, which is a 3 inches inside diameter, 10 feet long, internally glass-lined steel pipe, while the water saturated nitrogen gas is fed through purifier line 8. The water saturated gas is introduced into the atmosphere above the flowing liquid trichlorosilane creating a flowing vapor stream above the liquid stream. The temperature in line 8 ranges between 30° C. to 35° C., with an average temperature of about 32.5° C., and the pressure therein is 25 pounds per square inch gauge. The turbid appearing trichlorosilane is passed through line 10 to holding tank 11 which has a capacity of 500 gallons, while nitrogen gas is vented from line 9. The turbid trichlorosilane is passed from tank 11 through line 12 to distillation column 13. Purified, clear trichlorosilane of electronic grade is removed from line 14, and boron continuing residue is periodically removed from column 13 through line 15. Columns 5 and 13 may be of any size, e.g., from a one plate to 100 plates, or more, distillation column. In the laboratory, one plate stills may be most satisfactory whereas in commercial operations, 100 plates in the still may be desired.

The temperature of the chlorosilane during treatment depends on a number of factors, such as, whether water vapor is reacted with chlorosilane vapor in a zone contiguous or noncontiguous to the liquid body of chlorosilane, the desired rate of sequestration of the boron impurity, the volume of liquid chlorosilane treated, the amount of boron-impurity present in the liquid body, the pressure of the liquid body zone during sequestration, and the like. Usually, the temperature of the liquid body of chlorosilane is above about 0° C. and not above the boiling point of the chlorosilane, as determined at the pressure in the treatment zone.

Though this invention has been described with respect to a plurality of details thereof, it is not intended that the invention shall be so limited except to the extent provided in the claims.

What is claimed is:

1. The process of removing boron impurities from chlorosilanes selected from the group consisting of trichlorosilane. dichlorosilane and monochlorosilane which comprises dispersing preformed partial hydrolyzates of a chlorosilane selected from the group consisting of trichlorosilane, dichlorosilane and monochlorosilane in a clear liquid body of such chlorosilane containing an undesired quantity of boron impurity and thereafter separating chlorosilane from the partial hydrolyzates and from boron contained therein to obtain such chlorosilane which contains less than .15 parts per billion by weight of boron.

2. The process of removing boron impurities from chlorosilanes selected from the group consisting of trichlorosilane, dichlorosilane and monochlorosilane which comprises providing a clear liquid body of chlorosilane selected from the group consisting of trichlorosilane, dichlorosilane and monochlorosilane containing an undesired quantity of boron, with an atmosphere above it, which atmosphere contains water vapor and such chlorosilane as vapor in an amount equal to its partial pressure at the temperature of the body and the atmosphere, partially hydrolyzing chlorosilane in said atmosphere and depositing partial hydrolyzate from said atmosphere onto the surface of the body whereby the body is made cloudy, then clear chlorosilane which contains less than .15 part per billion by weight of boron is separated and recovered from partial hydrolyzate leaving boron impurities in combination with said partial hydrolyzate.

3. The process of claim 2 wherein the liquid body is a flowing stream and the water vapor is carried into the atmosphere in admixture with an inert gas.

4. The process of claim 2 wherein said separation is effected by distillation of the cloudy body.

5. The process of claim 2 wherein the mole concentration of chlorosilane vapor in the atmosphere exceeds the mole concentration of water in the atmosphere.

6. The process of claim 5 wherein the mole concentration of water in the atmosphere is at least equal to mole concentration of boron in the body of chlorosilane.

7. The process of claim 1 wherein the preformed hydrolyzate is made by reacting water vapor and a chlorosilane vapor in a zone apart from said liquid body.

8. The process of claim 1 wherein the preformed hydrolyzate is made by reacting water vapor and a chlorosilane vapor in a zone contiguous to said liquid body.

9. A continuous process of removing boron impurities from chlorosilane selected from the group consisting of trichlorosilane, dichlorosilane and monochlorosilane which comprises supplying a continuous, clear, liquid stream of a chlorosilane selected from the group consisting of trichlorosilane, dichlorosilane and monochlorosilane containing an undesired quantity of boron impurity to a zone possessing space therein for an atmosphere, which atmosphere comprises a flowing stream of water vapor and a chlorosilane vapor selected from the group consisting of trichlorosilane, dichlorosilane and monochlorosilane, and chlorosilane in said atmosphere is partially hydrolyzed, depositing partial hydrolyzate into said liquid stream to obtain a cloudy liquid stream, distilling the cloudy liquid to obtain a clear chlorosilane which contains less than .15 parts per billion by weight of boron.

10. The process of claim 9 wherein the chlorosilane is trichlorosilane.

11. The process of analyzing the boron content of silanes selected from the group consisting of trichlorosilane, dichlorosilane and monochlorosilane which comprises dispersing preformed partial hydrolyzates of a silane selected from the group consisting of trichlorosilane, dichlorosilane and monochlorosilane in a clear liquid body of such silane containing boron, thereby rendering said liquid body cloudy, separating the silane which contains less than .15 parts per billion by weight of boron from the partial hydrolyzate whereby boron content in the liquid body is left with the partial hydrolyzate to form a residuum and analyzing the residuum for boron.

References Cited

UNITED STATES PATENTS

| | | | |
|---|---|---|---|
| 2,820,698 | 1/1958 | Krchma | 23—205 |
| 3,071,444 | 1/1963 | Theurer | 23—223.5 |
| 3,117,838 | 1/1964 | Sterling et al. | 23—223.5 X |
| 3,403,003 | 9/1968 | Morgenthaler | 23—205 |

FOREIGN PATENTS 832,334  4/1960  Great Britain.

OSCAR R. VERTIZ, Primary Examiner

G. O. PETERS, Assistant Examiner

U.S. Cl. X.R.

23—230, 223